Feb. 17, 1931.   C. G. OLSON   1,792,548
HOB
Filed April 21, 1928   2 Sheets-Sheet 1

INVENTOR
CARL G. OLSON
By Cheever + Cox ATTYS

Feb. 17, 1931.  C. G. OLSON  1,792,548
HOB
Filed April 21, 1928    2 Sheets-Sheet 2
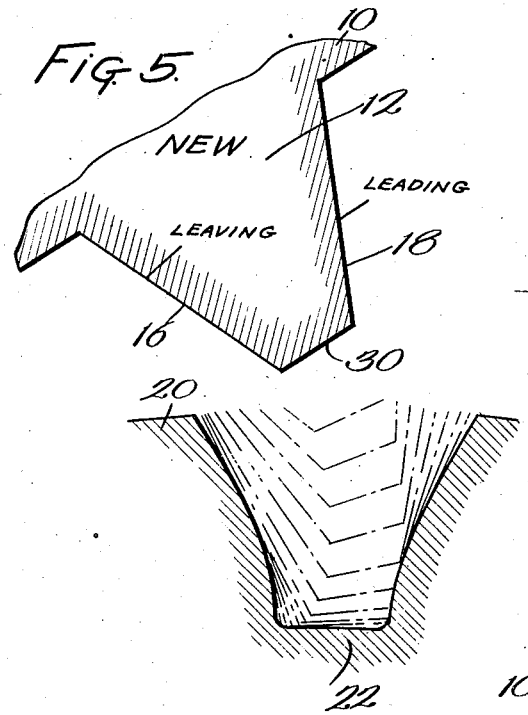
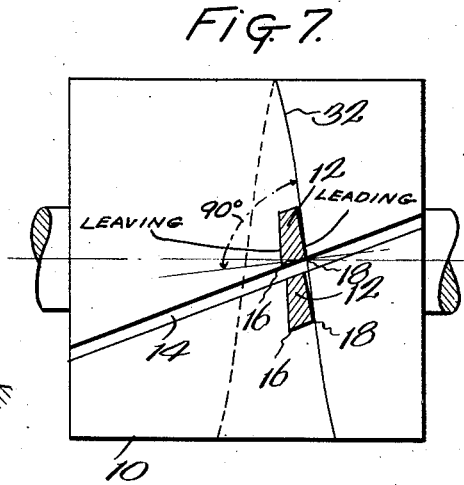
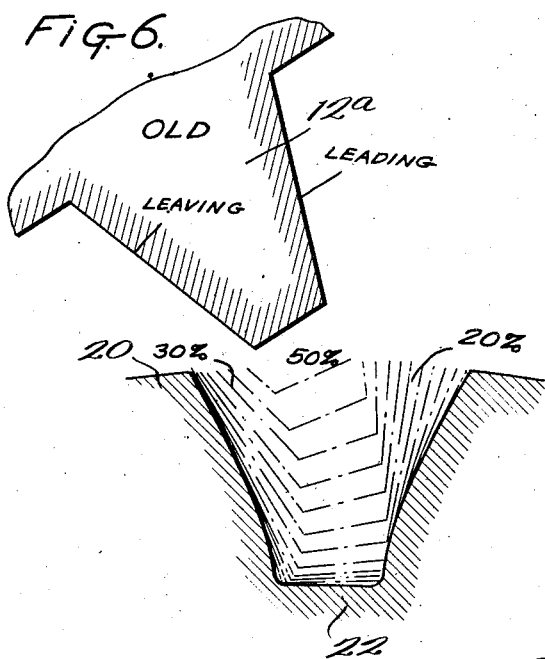
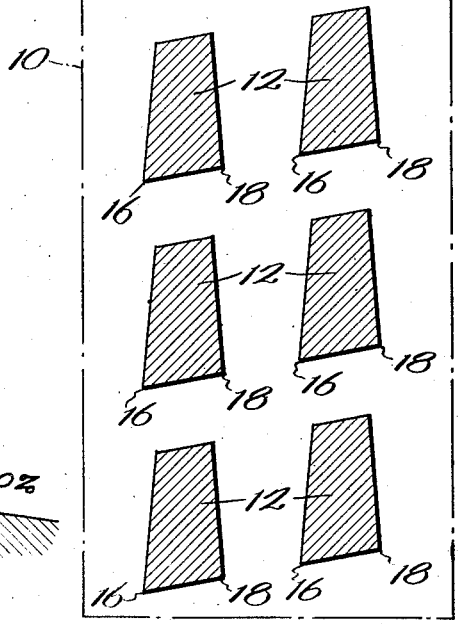
INVENTOR
CARL G. OLSON
By Cheever & Cox
ATTYS.

Patented Feb. 17, 1931

1,792,548

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATON OF ILLINOIS

HOB

Application filed April 21, 1928. Serial No. 271,694.

My invention relates to hobs for cutting spur gears and the like, and more particularly to a long lead hob having the leaving cutting edges of the teeth sharper than the leading cutting edges.

In my co-pending application, Serial No. 178,248, filed March 25, 1927, I have disclosed a short lead hob in which the leading cutting edges of the teeth are more acute, or in other words, sharper than the leaving cutting edges of said teeth. By providing the teeth in the short lead hob described in my above mentioned co-pending application with relatively steep sides and by providing spiral gashes or flutes extending transversely of and having the same direction of lead as the hob thread, I have been able to increase the sharpness of the leading cutting edges of the teeth and thereby increase the operating efficiency of the hob. My present application contemplates the provision of a hob which is provided with teeth having a cutting edge thereof of increased sharpness but differs from my above mentioned hob in that the cutting edge having the more acute or sharper characteristics is the leaving edge instead of the leading edge.

In general, it is an object of my invention to provide a hob in which the sharpness of the leaving edges of the teeth is increased at the expense of the leading edge, thereby presenting a long lead hob, the operating efficiency of which is far superior to hobs of ordinary design.

More specifically, it is an object of my invention to provide a long lead hob for cutting spur gear and the like in which the gashes thereof are spirally formed and extend transversely of the hob thread in a direction opposite to the lead of said thread so as to form the leaving portion of the teeth more acute and the leading portions thereof more obtuse.

Another object of my invention is to provide a hob of the molded generated type having a pressure angle which is greater than the pressure angle of the gear to be cut and having the leaving cutting edges of the teeth sharper than the leading cutting edges, thereby enabling said leaving cutting edge to remove a larger percentage of the gear blank stock as compared with the amount of stock removed by the leading cutting edges of the teeth.

These and other objects will be more apparent from the following detail description when considered in connection with the accompanying drawings wherein:

Figure 5 is a diagrammatic representation showing an outline or profile of a tooth of my improved hob and the manner in which it generates the gear teeth;

Figure 6 is a diagrammatic representation similar to Figure 5 and likewise shows an outline of an ordinary hob tooth and the manner in which it generates teeth of substantially the same size and shape as the teeth shown in Figure 5;

Figure 3:
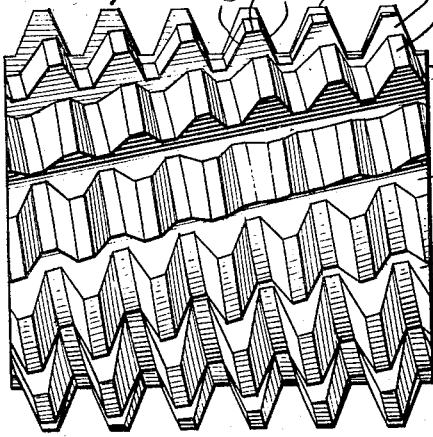
Figure 3 is a side elevational view of a long lead hob formed in accordance with the teachings of my invention.

Figure 7 is a diagrammatic side view of the hob shown in Figure 3, two of the hob teeth being shown in section in association with one of the gashes and a helical line enveloping the hob blank to indicate the helical arrangement of the teeth; and Figure 8 is a sectional view indicating the appearance of the hob teeth after being cut by a cylinder co-axial with the hob and passing through the teeth at some point between the top and the bottom thereof.

At this point is might be advisable to explain some of the differences between a hob having a standard lead and a hob having a relatively long or short lead. A hob is said to have a standard lead when the normal spacing of the thread is equal to the circular pitch of the gear to be cut. This requires that the angular disposition of the sides of the thread be equal to the pressure angle of the teeth of the gears to be cut when said gears are of standard pitch diameters. A short lead hob however, is one which is said to have a short lead when the normal spacing of the thread is less than the circular pitch of the gear to be cut and when the angular disposition of the sides of the thread are less than the actual presure angle of the gear to be cut so as to compensate for the short lead of said thread. A hob having a long lead is one in which the lead is said to be long when the normal spacing of the thread is greater than the circular pitch in the gear to be cut and when the angle of the side of the thread is greater than the pressure angle of the gear to be cut so as to compensate for the long lead. The present invention relates to a hob of the long lead type in which the normal spacing of the thread is greater than the circular pitch of the gear to be cut and hence the thread angle is greater than the pressure angle of the gear to be cut. As will hereinafter appear, a hob of my improved design is generated upon a circle of greater diameter than the diameter of the pitch circle of the gear to be cut.

In a gear cutting hob the oppositely disposed cutting edges of each tooth may be referred to as leading or leaving sides whatever the case may be. The leading cutting edge of a hob tooth is the side edge which is followed by one side of a gear tooth in the process of generating said tooth. The leaving cutting edge of the hob tooth is the side edge which follows one side of the gear tooth in the process of generating. If the above facts are borne in mind, it is believed that the following description of my improved hob will be more readily appreciated.

Figure 4:
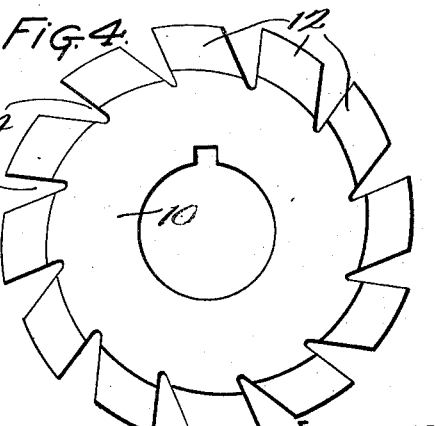
Figure 4 is an end view of the hob disclosed in Figure 3.

Referring now to the drawings wherein like numerals have been employed to designate similar parts throughout the figures, it will be seen in Figures 3 and 4 that I have disclosed a hob having a body portion 10 and a plurality of peripheral teeth 12. Spiral gashes or flutes 14 extend transversely of the hob thread and the lead of these gashes 14 is opposite to the lead of the hob threads. By forming the gashes 14 in the manner described, I am able to increase the sharpness of the leaving cutting edges 16 of the hob teeth at the expense of the leading cutting edges 18, the sharpness of which is correspondingly reduced. In other words, the leaving portions of the hob teeth 12 are more acute than the leading portions.

Figure 1:
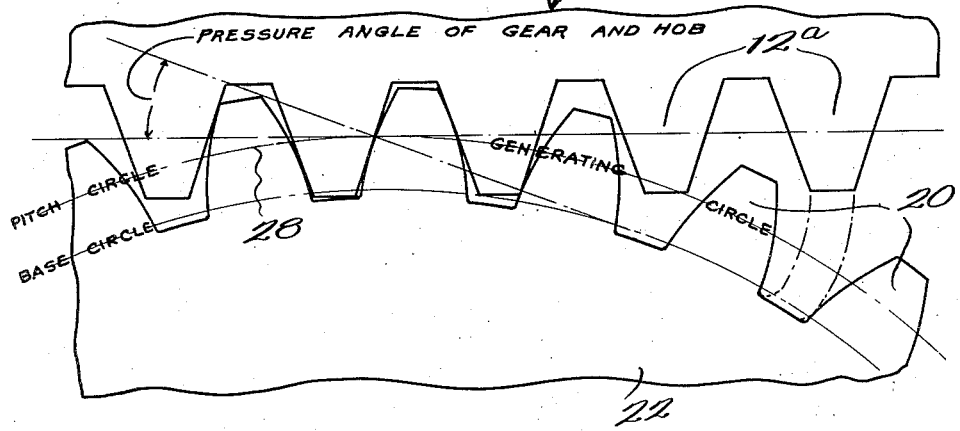
Figure 1 is a diagram on an enlarged scale showing an outline of a gear and of the teeth of an ordinary hob.
Figure 2:
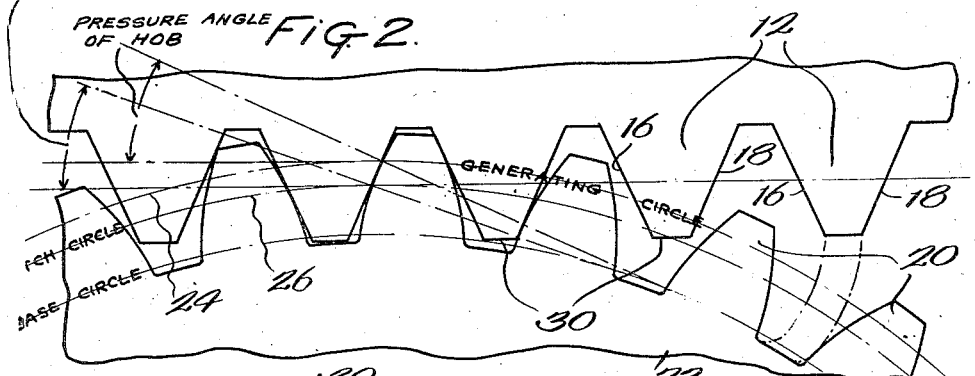
Figure 2 is a diagram similar to Figure 1 showing the same gear in association with the teeth of a hob embodying my invention.

Referring now to Figure 2, wherein I have diagrammatically disclosed the hob teeth 12 in association with the teeth 20 of a gear blank 22, it will be seen that my improved hob generates upon a line or circle 24 which is above the line 26 representing the pitch circle of the gear 22. Thus I form a long lead hob, the pressure angle of which is greater than the pressure angle of the gear which it is designed to cut. This long lead hob is to be distinguished from the normal hob shown in Figure 1 provided with teeth 12a which are shown in association with the teeth 20 of the gear blank 22. This hob generates along a line 28 which represents the pitch circle of the gear 22 and hence the normal lead of said hob is equal to the circular pitch of the gear.

From the foregoing it will be clear that the leaving cutting edges 16 are sharper than the leading cutting edges 18, and to further increase the cutting effectiveness of the hob-teeth I form the gashes 14 so as to under-cut the teeth 12 as clearly shown in Figure 4. By under-cutting the teeth in this manner, and by helically forming the gashes as described, the top cutting edges 30 of the teeth are formed obliquely. By having this oblique arrangement of the top cutting edges of the teeth, said teeth are adapted to make a shearing cut and hence the cutting effectiveness thereof is materially increased. By referring to Figures 5 and 6, the operating effectiveness of the leaving cutting edge of my improved long lead hob will be readily understood. In Figure 6 I have shown the manner in which the tooth 12a of an ordinary hob cuts the hob blank or gear 22. It will be noted that in this instance about 30% of the material is removed by the leaving cutting edge and 20% by the leading cutting edge. In Figure 5, however, it will be seen that the tooth 12, formed in accordance with my invention, removes a greater percentage of the material by the leaving edge as compared to the amount of material removed by the leading cutting edge. It is to be understood however that the particular percentages referred to are given merely for purposes of illustration and are not offered as being mathematically accurate.

To more clearly illustrate the acuteness of the leaving portion of the hop teeth 12, I have shown a diagrammatic representation of the hob and one of the spiral gashes 14 thereof (Figure 7). In this figure, it will be seen that the leaving cutting edge is considerably sharper than the leading cutting edge and a helical line 32 is shown to indicate the helical arrangement of the hob teeth. In Figure 8, the acuteness of the leaving tooth portion and the obtuseness of the leading tooth portion are clearly shown.

From the foregoing description, it will be seen that my invention contemplates the provision of long lead hobs which are adapted to very expeditiously remove stock in cutting gears. Although the increase in the sharpness of the leaving cutting edge of the teeth is accomplished at the expense of the leading cutting edge, the operating efficiency of the hob is decidedly increased over the hobs of ordinary design and proportions. The helical arrangement of the gashes will be dependent to a certain extent, upon the thread angle of the hob and in this connection it is to be understod that the hob disclosed in Figures 3 and 4 is merely representative of a hob having a thread angle which will permit the use of gashes having a lead substantially as shown.

It will also be apparent from the foregoing description that the inclination of the sides of the hob teeth formed in accordance with my invention will be of such a degree as to cause the hob to generate upon a circle which is greater in diameter than the pitch circle of the gear to be cut and that the teeth are under-cut so as to increase the sharpness of the top cutting edges. By increasing the acuteness or sharpness of the top portions of the teeth, said teeth will make a shearing cut which greatly facilitates the ease with which material may be removed from a gear blank.

Having thus described my invention, what I claim as new and desire to secure by Letters Patent is:

1. A generating hob for cutting involute gears, the sides of the hob teeth having a slope which is greater than in a hob in which the sides of the teeth conform to the pressure angle of the teeth of the gear to be cut so as to cause them to generate gear teeth of a given pressure angle when generating on a circle of larger diameter than the pitch circle of the gear to be cut.

2. A hob for cutting involute gears, the sides of the hob teeth having a slope which is greater than in a hob in which the sides of the teeth conform to the pressure angle of the teeth of the gear to be cut so as to cause them to generate gear teeth of a given pressure angle when generating on a circle of larger diameter than the pitch circle of the gear to be cut, the front faces of the teeth being under-cut to render the top cutting edge more acute.

3. A hob having teeth with an obtuse leading cutting edge and an acute leaving cutting edge, the teeth having straight lines when viewed in profile upon a plane passing approximately diametrically through the hob, the teeth being broader at the bottom and narrower at the top than in a hob in which the sides of the teeth conform to the pressure angle of the teeth of the gear to be cut.

4. A hob having spiral gashes of the opposite hand lead as the thread of the hob, the teeth having straight lines when viewed in profile upon a plane passing approximately diametrically through the hob, the teeth being narrower at the top and wider at the bottom than in a hob in which the sides of the teeth conform to the pressure angle of the teeth of the gear to be cut, the hob teeth being under-cut to thereby produce an acute angle at the top cutting edge of the hob teeth.

5. A hob having spiral gashes oblique to the thread of the hob and of opposite hand lead as the thread of the hob thereby increasing the sharpness of the cutting edge at the leaving side of the hob teeth, said hob teeth having sides of greater inclination than the teeth of hobs whose teeth are equal to the lead of the circular pitch of the gear to be cut.

6. A hob for cutting ordinary involute tooth gears, said hob having gashes oblique to the thread of the hob and extending in a direction to increase the sharpness of the cutting edge of the leaving side of the hob teeth, said hob teeth having sloping sides which generate gear teeth of a given pressure angle when generating on a circle of larger diameter than the pitch circle of the gear to be cut, the hob teeth being under-cut to thereby produce an acute cutting angle at the top cutting edge of the hob teeth.

In witness whereof, I have hereunto subscribed my name.

CARL G. OLSON.